UNITED STATES PATENT OFFICE.

LE GRAND KNIFFEN, OF CHICAGO, ILLINOIS.

STOCK-FEED MACHINE.

SPECIFICATION forming part of Letters Patent No. 593,380, dated November 9, 1897.

Application filed August 26, 1896. Serial No. 603,956. (No model.)

*To all whom it may concern:*

Be it known that I, LE GRAND KNIFFEN, a citizen of the United States of America, residing at Chicago, in the county of Cook and State of Illinois, have invented certain new and useful Improvements in Stock-Feed Machines, of which the following is a specification.

My invention relates to certain improvements in stock-feed machines, the object being to connect a feed-cutter and feed-grinding machine in such a manner that both will be supported by one main framework and driven by a single drive wheel and shaft, thus doing away with the necessity of using two separate shafts and driving-pulleys, as in independent machines of this class.

To such end the invention consists in certain novel features of construction, which will be fully described in the specification and particularly pointed out in the claims.

In the drawings presented herewith, Figure 1 is an end view of a feed-cutter and feed-grinder connected by my improved connecting devices. Fig. 2 is a view thereof, partly in plan and partly in horizontal section, the section being taken through the line 2 2, Fig. 1. Fig. 3 is a perspective view of a bracket used in connection with my invention. Fig. 4 is a perspective view of the bracket, showing also the means for vibrating the feed-chute used in the feed-grinder. Fig. 5 is a detail section of a grinding-bur used in the feed-grinder and showing the means for connecting the bur with the main driving-shaft of the feed-cutter. Fig. 6 is a detail cross-section through the line 6 6, Fig. 5. Fig. 7 is a similar view through the line 7 7, Fig. 5. Fig. 8 is a detail front view of one of the standards which supports the hopper of the feed-grinder. Fig. 9 is a central longitudinal section through the line 9 9, Fig. 10; and Fig. 10 is a horizontal section through the line 10 10, Fig. 9.

In order to properly illustrate my invention, I have shown a feed-cutter of that class in which the stock is continuously fed into the same from one end and cut into small particles such as will be desirable for feed for cattle. A feed-grinder is also shown in the drawings which is adapted to grind kernels of corn, oats, &c., into very small particles. These two machines taken separately are of known forms, but are the most suitable for my purpose.

In Figs. 1, 9, and 10, A A A' represent two vertical members and the base, respectively, of the framework of a feed-cutter, and $A^2$ the spout or chute through which the cut feed is discharged. B represents the concave in which rotatable cutters B' are arranged, these cutters being adapted to cut the stock into small particles and receiving their rotating motion from a shaft C, upon which is mounted a wheel C', which may either be used as a fly-wheel or belt-wheel, as may be desired. In this class of feed-cutters the other operating portions of the machine are driven by gearing the same to the shaft C, and I have shown a gear-wheel upon this shaft which may evidently rotate the other gears, thus imparting the motion to the other operating portions of the feed-cutter.

To the framework of the feed-cutter are secured two beams $A^3$ $A^3$, one arranged above the other and extending laterally from the machine, the ends of these beams being connected by two vertical beams $A^4$ $A^5$, thus making a perfectly-rigid framework capable of sustaining a considerable weight. The object of this framework is to support two gear-wheels, one of which is seen at $C^2$, (see Fig. 2,) secured upon a shaft c, the other gear being in mesh with the gear $C^2$, arranged above the same and fast upon a shaft c', extending into the feed-cutter. The shafts c c' are adapted to carry feed-rollers which feed the stock into the machine.

The grinder is seen in Figs. 1 and 2, and comprises, with other elements, a hopper D, in which grain—such as corn, oats, &c.—may be placed, and a vibrating feed-chute d, located immediately below the spout of the hopper D and vibrated by means of a device hereinafter described, this vibrating chute being adapted to discharge the grain into the grinding-mill proper, E, which is provided with two grinding-disks e e', of ordinary construction, such as are used in grinding-mills of this class. A discharge-spout E' is formed upon the lower portion of the grinding-mill and is adapted to deliver the ground feed into suitable receptacles provided therefor.

The feed cutter and grinder thus far de-

UNITED STATES PATENT OFFICE.

VERNON A. LAUE AND MATHEW M. PIERCE, OF CROSS FORK, PENNSYLVANIA.

INDEX.

SPECIFICATION forming part of Letters Patent No. 593,528, dated November 9, 1897.

Application filed April 13, 1897. Serial No. 631,979. (No model.)

*To all whom it may concern:*

Be it known that we, VERNON A. LAUE and MATHEW M. PIERCE, citizens of the United States, residing at Cross Fork, in the county of Potter and State of Pennsylvania, have invented a new and useful Index, of which the following is a specification.

This invention relates to indexes of that class in which the names and other subject-matter constituting the index are arranged on a series of tablets which are carried by holders supported in guideways and which are normally out of sight. Each holder is connected by levers and links to a separate key, which when depressed will cause the holder and its tablet to be moved into sight in order that the index may be inspected. The object of the invention is to improve the structure of devices of this character; and the invention consists of the several details of construction and combinations of parts, as will be hereinafter fully described, and particularly pointed out in the claims.

In the drawings, Figure 1 is a perspective view of an index made in accordance with my invention, the front and the top of the casing being removed to show the arrangement of some of the parts. Fig. 2 is a vertical longitudinal section. Fig. 3 is a vertical transverse section. Fig. 4 is a perspective view of one of the tablet-holders detached. Fig. 5 is a perspective view of one of the keys and its stem detached.

Similar reference-numerals indicate similar parts in the several figures.

1 indicates a casing which is provided with a hinged top 2 and with an extension 3, projecting forwardly at its lower portion, the top plate 4 of which extension is inclined.

5 indicates a horizontal plate supported in the main casing 1, and this plate is provided with a series of elongated slots 6 in its middle portion and with a series of end slots 7, which are in alinement with the middle slots 6.

8 represents plates one of which is secured to the inner face of each side of the casing 1 and is supported on the horizontal plate 5. Each of these plates is provided with a series of vertical grooves which serve as guideways for the tablet-holders and register with the end slots 7 in the plate 5. The tablet-holders consist of two vertical bars 10, which are connected at their lower ends by a cross-bar 11. The bars 10 and 11 are grooved, as indicated at 12, for the reception of the tablet 13. The bars 10 are provided with downward extensions 14, which project through the slots 7 when the holders are in their normal position. Each of the bars 11 is provided with a downwardly-projecting ear or lug 15, which extends through one of the slots 6 in the plate 5.

16 represents bars one of which is secured to the inner face of each of the sides of the casing 1 below the plate 5, and each of these bars is provided with a series of spaced ears 17, the outer ends of which are perforated, as indicated at 18.

19 represents a rod which extends through and is supported in the perforations 18, and on this rod are pivoted a series of angle-levers 20. The long arms 21 of the levers 20 are connected by links 22 to the ears 15 of the holders.

23 represents a bar which is arranged transversely of the machine within the extension 3 and near its forward end. This bar is provided with a series of spaced ears, the upper ends of which are perforated, as indicated at 25.

The levers 26 are pivoted at their front ends on a rod 27, which extends through and is supported in the perforations 25 in the spaced ears 24. The rear ends of these levers are respectively connected by means of links 28 to the short arms 29 of the levers 20.

30 represents keys the stems 31 of which extend through suitable openings in the inclined plate 4. The lower ends of these stems are bifurcated, as indicated at 32, to straddle the levers 26 and to which they are pivotally connected. Each stem is provided with a shoulder 33, which is adapted to engage the under face of the plate 4 when the key is depressed to its full extent and given a slightly forward movement. These shoulders are provided in order that the tablet-holders may be held in an elevated position when desired.

34 indicates a series of vertical pins secured in the bottom of the casing and between which the levers 26 are guided. These pins are for the purpose of preventing lateral